US010299627B2

(12) United States Patent
Kuo et al.

(10) Patent No.: US 10,299,627 B2
(45) Date of Patent: May 28, 2019

(54) MECHANICAL ARM FOR A STIR-FRYING ACTION IN COOKING

(71) Applicant: Ang-Tsang Cho, Taipei (TW)

(72) Inventors: Chung-Hsien Kuo, Taipei (TW); Chen-Huan Feng, New Taipei (TW); Yu-Cheng Kuo, Taipei (TW); Chia-Yu Hu, Chiayi County (TW)

(73) Assignee: Ang-Tsang Cho, Taipei (TW)

( * ) Notice: Subject to any disclaimer, the term of this patent is extended or adjusted under 35 U.S.C. 154(b) by 400 days.

(21) Appl. No.: 15/351,968

(22) Filed: Nov. 15, 2016

(65) Prior Publication Data
US 2018/0055285 A1 Mar. 1, 2018

(30) Foreign Application Priority Data

Aug. 26, 2016 (TW) .............................. 105127568 A

(51) Int. Cl.
*A47J 37/10* (2006.01)
*A47J 27/14* (2006.01)
*A47J 37/12* (2006.01)

(52) U.S. Cl.
CPC .............. *A47J 37/108* (2013.01); *A47J 27/14* (2013.01); *A47J 37/10* (2013.01); *A47J 37/1266* (2013.01); *A47J 37/1271* (2013.01); *Y10S 901/15* (2013.01); *Y10S 901/23* (2013.01); *Y10S 901/28* (2013.01)

(58) Field of Classification Search
CPC .......... A47J 37/10; A47J 37/106; A47J 27/14; A47J 43/08; Y10S 901/15; Y10S 901/23; Y10S 901/25; Y10S 901/28

USPC ........... 99/348, 334, 422, 423; 901/1, 14, 15
See application file for complete search history.

(56) References Cited

U.S. PATENT DOCUMENTS

| | | | |
|---|---|---|---|
| 5,088,390 A * | 2/1992 | Wong | A47J 43/04 99/327 |
| 7,174,830 B1 * | 2/2007 | Dong | B25J 9/0084 901/1 |
| 7,930,973 B2 * | 4/2011 | Wong | A47J 37/108 366/144 |
| 8,834,489 B2 * | 9/2014 | Cooper | A61B 90/10 606/130 |

(Continued)

FOREIGN PATENT DOCUMENTS

DE 102015012960 A1 * 2/2017 ........... B25J 9/0009

*Primary Examiner* — Reginald Alexander
(74) *Attorney, Agent, or Firm* — Muncy, Geissler, Olds & Lowe, P.C.

(57) ABSTRACT

A mechanical arm and an operation system to perform a stir-frying action in cooking. The mechanical arm has motors and a plurality of links connecting with a pan. The links length and the binding angle are limited according to the pan action and the chefs' wrist through sum of sine function. In the other hands, weight and viscosity are different between different food materials. The operation system further controls the parameters, which include the velocity, the speed ratio of forward and backward, the rising time, the angel region of motor and the initial angle offset of pan, to adjust the action of mechanical arm performing the stir-flying action. It is suitable to decrease the time of food cooking and the hand burden. Therefore, the chefs can have more time to produce pre-treatment or post-production.

8 Claims, 6 Drawing Sheets

(56) References Cited

U.S. PATENT DOCUMENTS

2015/0251322 A1* 9/2015 Goodwin ............... B25J 11/008
                                                    74/490.03
2016/0059412 A1* 3/2016 Oleynik .................. B25J 9/163
                                                    700/257

* cited by examiner

Pressing downward   Moving forward   Pulling upward   Pulling backward.

MECHANICAL ARM FOR A STIR-FRYING ACTION IN COOKING

CROSS-REFERENCE TO RELATED APPLICATIONS

This Non-provisional application claims priority under 35 U.S.C. § 119(a) on Patent Application No(s). [105127568] filed in Taiwan, Republic of China [Aug. 26, 2016], the entire contents of which are hereby incorporated by reference.

FIELD OF THE INVENTION

The present invention is related to a mechanical arm and an operation system, especially related to a five-linkage mechanism designed mechanical arm, wherein the length of links and joint angles are limited by a regressive trajectory equation, simulating the human's motion trajectory of stir-frying action and finishing the action automatically.

BACKGROUND OF THE INVENTION

Finger stenosing tenosynovitis (also known as trigger finger) is a common occupational injury among cookers, the reason is that one hand stir frying action needs some cooking progress. For example, during the spaghetti cooking process, the sauce needs to be distributed into the noodles evenly, thus the cookers need to use large effort on wrist and thumb. After long time spaghetti cooking, the chef's muscle and joints would easily be injured. Accordingly, the inventors design a mechanical arm to replace the stir-frying action as automatic production, so as to reduce the burden of wrist and fingers and save time during cooking. The cookers could have more time on handling the food materials or dishing up after cooking, so that the cookers' production efficiency would be increased.

At the present time, there are some human-simulated mechanical arms on the market, which are mostly designed as multi-linkage system. The distance between pans would be increased due to the only one fixed point, so that the output energy generated from the joint motors needed to be increased. That means, these marketed mechanical arms are energy consuming and the motor joints would easily be damaged. Moreover, the momentary effort and position on a specific joint is required during the stir-frying action, and the momentary weight generated in the pan from the food materials is also needed to be considered. Therefore, the present invention could overcome the shortcoming of the existing technologies by changing the design of mechanical arm and adjusting the motor angular movement, and provides a low energy consuming automatic stir-frying action for different food materials in the pan by controlling the parameters. In comparison with the existed industrial mechanical arm, the present invention provides a small size parts that are combined design to make a relatively structure stable mechanical arm, and its price is lower than the marketed products.

SUMMARY OF THE INVENTION

Accordingly, one object of the present invention is to provide a mechanical arm for performing a stir-frying action in cooking, which comprises: a fixed base, a first rocker link, a first float link, a second rocker link, a second float link, and a third rocker link.

Wherein the fixed base is consisted by a first motor and a second motor, wherein a first length ($a_5$) is between the first motor and the second motor.

Wherein the first rocker link has a second length ($a_1$), wherein a first end (A) of the first rocker link is connected with the first motor, and the first motor is used for driving the first rocker link to do a first angular movement ($\theta_{motor1}=\theta_{bac}+\theta_{cae}$).

Wherein the first float link has a third length (a2), wherein one end of the float link is cotter jointed with a second end of the first rocker link.

Wherein the second rocker link, which has a fifth length, wherein a first end (E) of the second rocker link is connected with the second motor, and the second motor is used for driving the second rocker link to do a second angular movement ($\theta_{motor2}=\theta_{dem}+\theta_{mme}$), a second end (D) of the second connecting end is cotter jointed with a sixth length ($a_3$) that is between the cutting joint point and the first end of the second float link.

Wherein the second float link has a fourth length ($L_{cm}$), wherein a first end (C) of the second float link is cotter jointed with a second end of the first float link, wherein the second end of the second float link has a third motor.

Wherein the third rocker link has a seventh length ($L_{mp}$), wherein a first end (M) of the third rocker link is connected with the third motor, and the third motor is used for driving the third rocker link to do a third angular movement.

Wherein the first length ($a_5$), the second length ($a_1$), the third length ($a_2$), the fourth length ($L_{cm}$), the fifth length ($a_4$), and the sixth length ($a_3$) are not limited to the length of any specific mechanical link; besides, the first angular movement, the second angular movement, and the third angular movement are not limited to any specific motor joint controlled angular movement.

Preferably, the mechanical arm of the present invention further comprises a control device, which has a speed level adjusting module, a speed ratio of forwarding and returning strokes adjusting module, a rising time adjusting angle module, a motor joint angles adjusting module, a frying pan initial angle adjusting module for controlling the performance of stir-frying action by parametric trajectory.

Another object of the present invention is to provide an automatic production kitchen, which includes: an above mentioned mechanical arm, a pan, a heating device, a material preparation device, and a control device.

The pan is installed in the second end of the third rocker link of the mechanical arm.

The heating device is used for detecting the temperature of the pan and for providing a heating temperature.

The material preparation device has a plurality of material preparation space for holding foods materials.

The operation device is used for controlling the material preparation device to open the corresponding material preparation space and load the food materials into the pan when receiving a stir-frying command, and is used for controlling the stir-frying action of the mechanical arm and the heating temperature provided by the heating device.

After observing the chef's movement during performance of stir-frying action, we found that all the movements are limited on a vertical plane, which can be divided into movements such as pressing downward, moving forward, pulling upward and pulling backward. As shown in FIG. 1, wherein the motion trajectory of the pan centre shows a inclined elliptical trajectory because the pan is controlled moving forward and pulling backward by chef's arm, and the pressing downward and pulling upward by chef's arm at the same time (as shown in FIG. B), therefore, the present invention provides a 2-Dimensional plane movement mechanical arm through a five-link mechanical design to fix two sets of motors on a fixed base to force on the mechanical arm and to set another motor on the terminal of the design to force on the mechanical arm, which is assisted by a motion limitation equation, to perform a stir-frying action by mimicking the chef's motion trajectory. Comparing with the existing technique, the body weight of entire mechanical arm can be distributed into individual motors to reduce the burden of each motor, so as to regulate the force of three motors effectively to smooth the stir-frying action.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

Figure 1A:
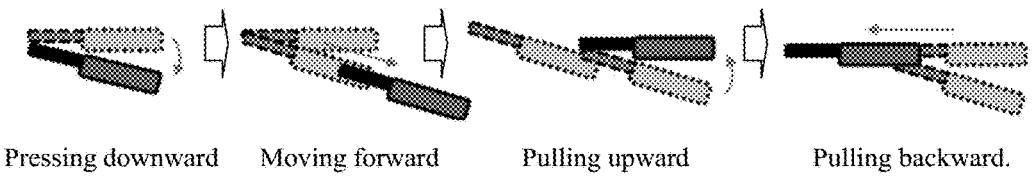
FIG. 1A and FIG. 1B illustrate the flow chart and the motion trajectory figures of a stir-frying action.
Figure 1B:
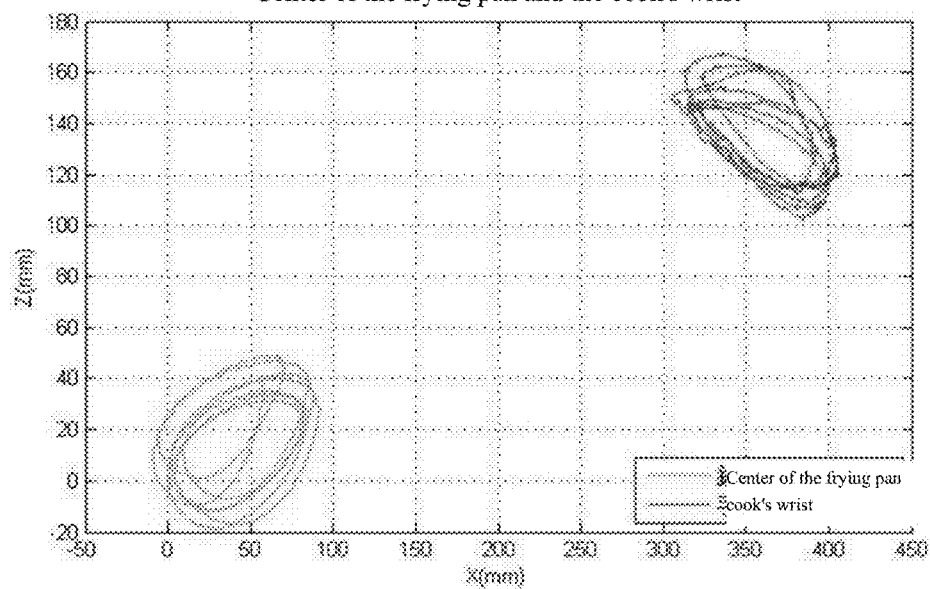

SYMBOLS mechanical arm 200-400
fixed base (AE)
first rocker link (AB)
second rocker link (DE)
third rocker link (MP)
first float link (BC)
second link (CM)
first motor (A)
second motor (E)
third motor (M)
first length ($a_5$)
second length ($a_1$)
third length ($a_2$)
fourth length ($L_{cm}$)
fifth length ($a_4$)
sixth length ($a_3$)
seventh length ($L_{mp}$)
first angular movement
second angular movement
third angular movement
coupling (310)
bearing holder (320)
control device (410)
speed level adjusting module (411)
speed ratio of forwarding and returning strokes adjusting module (412)
rising time adjusting angle module (413)
motor joint angles adjusting module (414)
frying pan initial angle adjusting module (415)

DETAILED DESCRIPTION OF THE INVENTION

The following descriptive embodiments and the corresponding figures and symbols in the embodiments are illustrative description for the examiners of USPTO and the persons skilled in the art to understand the spirit of the present invention completely.

To solve the problem caused by training the cooking experts and the damage of repeating and continuous movement for long time, the present invention constructs a model by professional chef's movement. The trajectories of the center of the frying pan and the cook's wrist are investigated, and the sum of sine function is further used to generate the regressive trajectory equation. According to the regressive trajectory equation, the mechanical arm is constructed by motors and plurality of linked pan to reproduce the motion trajectory stir-frying action.

Figure 2A:
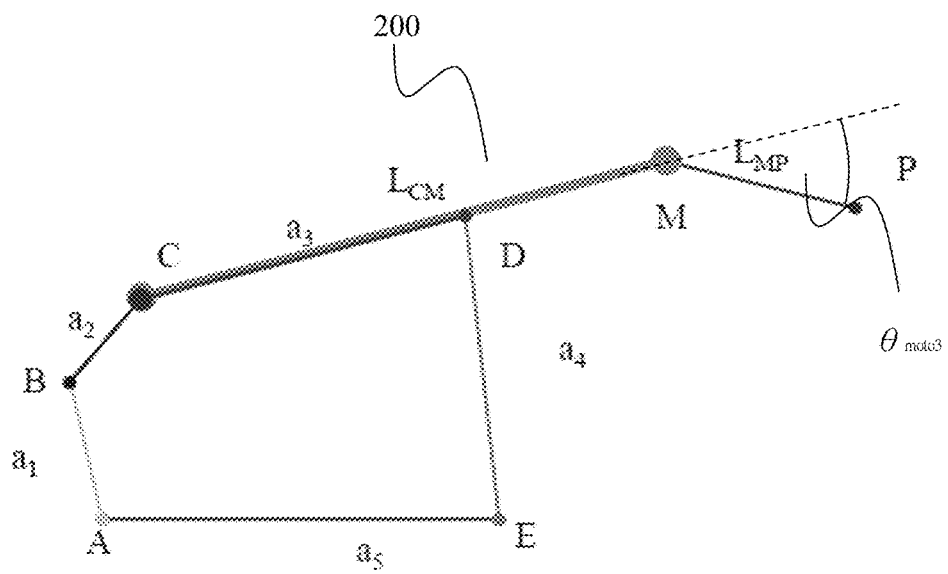
FIG. 2A and FIG. 2B illustrate the schematic diagrams of the structure of the mechanical arm and the schematic diagrams of angular movement of the present invention.
Figure 2B:
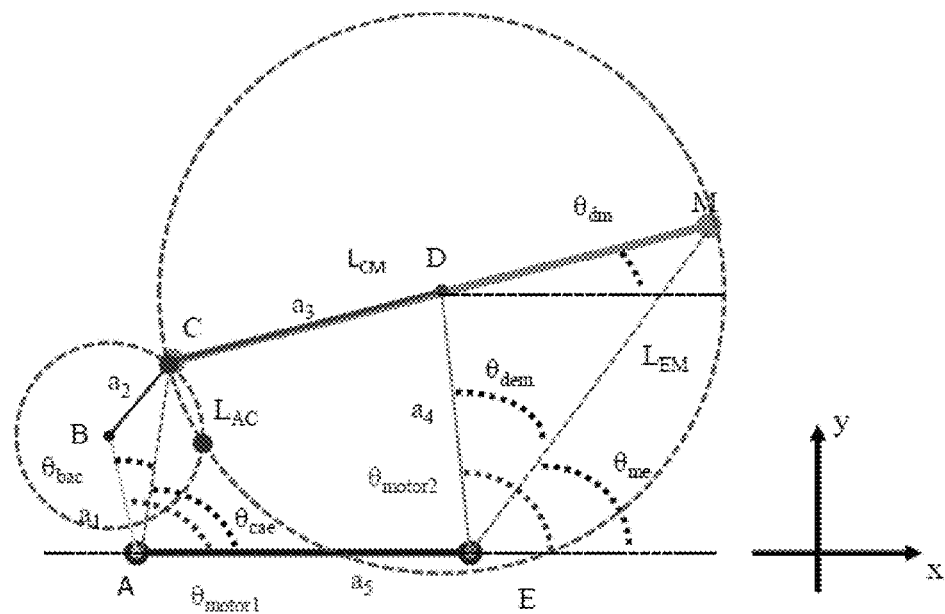

Please referring to FIG. 2A and FIG. 2B, the present invention provides a mechanical arm for performing a stir-frying action in cooking, which comprises: a fixed base (AE), a first rocker link (AB), a first float link (BC), a second float link (CM), a second rocker link (DE), and a third rocker link (MP).

Wherein the fixed base (AE) is consisted of a first motor (A) and a second motor (E), wherein a first length ($a_5$) is between the first motor (A) and the second motor (E).

Wherein the first rocker link (AB) has a second length ($a_1$), wherein a first end (A) of the first rocker link (AB) is connected with the first motor (A), and the first motor (A) is used for driving the first rocker link (AB) as a first angular movement ($\theta$ motor1=$\theta_{bac}+\theta_{cae}$).

Wherein the first float link (BC) has a third length ($a_2$), wherein one end of the float link (BC) is cotter jointed with a second end of the first rocker link (AB)

Wherein the second float link (CM) has a fourth length ($L_{cm}$), wherein a first end (C) of the second float link (CM) is cotter jointed with a second end of the first float link (BC), and the second end of the second float link (CM) has a third motor (M).

Wherein the second rocker link (DE) has a fifth length (a4), wherein a first end (E) of the second rocker link (DE) is connected with the second motor (E), and the second motor (E) is used for driving the second rocker link (DE) as a second angular movement ($\theta_{motor2}=\theta_{dem}+\theta_{mme}$), a second end (D) of the second connecting end is cotter jointed with a sixth length ($a_3$) that is between the cutting joint point and the first end of the second float link (CM).

Wherein the third rocker link (MP) has a seventh length ($L_{mp}$), wherein a first end (M) of the third rocker link (MP) is connected with the third motor (M), and the third motor (M) is used for driving the third rocker link (MP) as a third angular movement ($\theta_{moto3}$).

Figure 3:
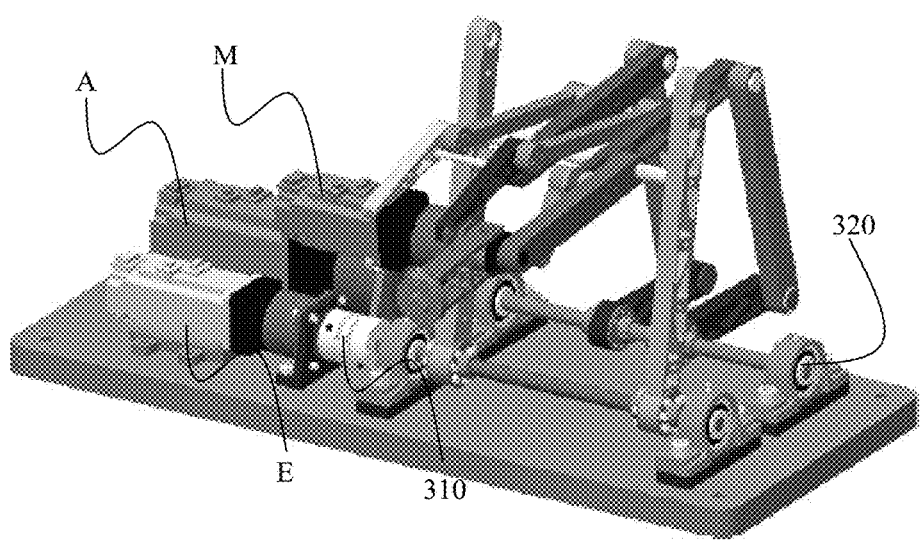
FIG. 3 shows the mechanical parts of mechanical arm in the embodiment of the present invention.

Please referring to FIG. 3, the present invention extends motor axis of the mechanical arm via the utilization of coupling (310) that combines with the bearing holder (320) that is used for stabilizing the whole structure on the fixed base; moreover, the symmetric design of the mechanical arm can force on two sides at the same time, to avoid the structure damage from forcing on only one side. In consideration of the long time and repeating cooking process in the kitchen, aluminum alloy is used as the main material of the mechanical arm of the present invention, so that the mechanical arm can be used under high temperature and humid environment.

Wherein the first length ($a_5$), the second length ($a_1$), the third length ($a_2$), the fourth length ($L_{cm}$), the fifth length ($a_4$), and the sixth length ($a_3$) are not limited to the length of any specific mechanical link; besides, the first angular movement, the second angular movement, and the third angular movement are not limited to any specific joint controlled angular movement. Preferably, the first angular movement ($\theta_{motor1} = \theta_{bac} + \theta_{cae}$) and the second angular movement ($\theta_{motor2} = \theta_{dem} + \theta_{mme}$) are selected form the equation group of the first length ($a_5$), the second length ($a_1$), the third length ($a_2$), the fourth length ($L_{cm}$), the fifth length ($a_4$), and the sixth length ($a_3$).

The movement condition of the mechanical arm is limited to match the performance of the stir-frying action, wherein the equation group comprises the following limitation equation:

$$\theta_{me} = \tan^{-1}\left(\frac{M_y - E_y}{M_x - E_x}\right)$$

$$\theta_{dem} = \cos^{-1}\left[\frac{(a_4^2 + L_{EM}^2 - (L_{CM} - a_3)^2)}{2a_4 L_{CM}}\right]$$

$$\theta_{motor2} = \theta_{me} + \theta_{dem}$$

$$D_x = E_x + a_1 \cos\theta_{motor2}$$

$$D_y = E_y + a_1 \sin\theta_{motor2}$$

$$\theta_{dm} = \tan^{-1}\left(\frac{M_y - D_y}{M_x - D_x}\right)$$

$$C_x = D_x + a_3 \cos\theta_{dm}$$

$$C_y = D_y + a_3 \sin\theta_{dm}$$

$$\theta_{cae} = \tan^{-1}\left(\frac{C_y - A_y}{C_x - A_x}\right)$$

$$\theta_{bac} = \cos^{-1}\left[\frac{(a_1^2 + L_{AC}^2 - a_2^2)}{2a_1 L_{CM}}\right]$$

$$\theta_{motor1} = \theta_{cae} + \theta_{bac}$$

Preferably, the range of the first angular movement is from 0 to 120 degree, the range of the second angular movement is from 80 to 120 degree, and the range of the third angular movement is from 90 to 120 degree.

Figure 4:
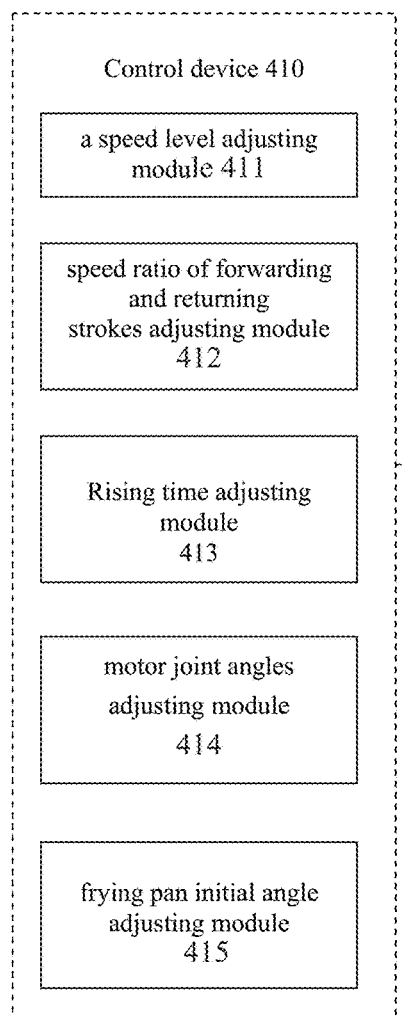
FIG. 4 shows the schematic diagram of the control device of mechanical arm in the embodiment of the present invention.
Figure 4:
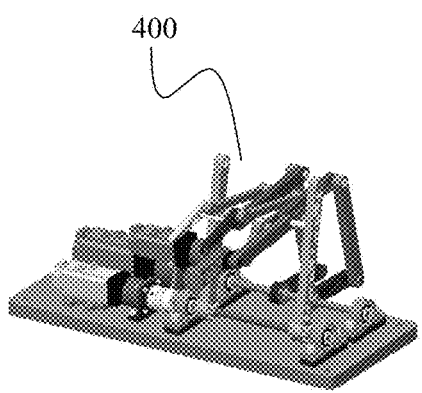

Please referring to FIG. 4, the mechanical arm of the present invention further comprises: a control device (410), which is used for wired or wireless adjusting the control parameters for different cooking conditions to maintain the best stir-frying action trajectory. For different kinds of food ingredients and different cooking conditions, the user can make parametric adjustment of the links length and the trajectory of motor angular motion through the control device (410).

The control device (410) has: a speed level adjusting module (411), a speed ratio of forwarding and returning strokes adjusting module (412), a rising time adjusting angle module (413), a motor joint angles adjusting module (414), a frying pan initial angle adjusting module (415) for controlling the performance of stir-frying action by parametric trajectory.

The speed level adjusting module (411), which is used for controlling the time duration of the first angular movement ($\theta_{motor1}$), the second angular movement ($\theta_{motor2}$) and the third angular movement ($\theta_{motor3}$) to complete a stir-frying action. The higher regulated speed would make stir-frying' height higher, and the food materials would be more backward in the pan; conversely, the slower regulated speed would make stir-frying' height lower, and the food materials would be more forward in the pan.

The speed ratio of forwarding and returning strokes adjusting module is used for controlling the time duration of the first angular movement ($\theta_{motor1}$) and the second angular movement ($\theta_{motor2}$) to do a horizontal direction action of the third motor (M). The higher regulated speed ratio of forwarding and returning strokes would make stir-frying' height higher, and the food materials would be more dispersed in the pan; conversely, the lower regulated speed ratio of forwarding and returning strokes would make stir-frying' height lower, and the food materials would be more centralized in the pan.

The rising time adjusting module (413) is used for controlling the time duration of the first angular movement ($\theta_{motor1}$) and the second angular movement ($\theta_{motor2}$) to do a vertical direction action of the third motor (M). The more regulated rising time would make the food materials in the pan more stirs; conversely, the less regulated rising time would make the food materials in the pan less stirs.

The motor joint angles adjusting module (414) is used for controlling the time duration of the third angular movement ($\theta_{motor3}$). When the regulated motor angle becomes larger, the food materials would be more dispersed in the pan; conversely, when the regulated motor angle becomes smaller, the food materials would be more forward in the pan.

The frying pan initial angle adjusting module (415) is used for controlling the initial angle of the third angular movement ($\theta_{motor3}$). When the regulated frying pan initial angle becomes larger, the food materials would be more backward in the pan; conversely, when the regulated motor angle becomes smaller, the food materials would be more forward in the pan.

Figure 5A:
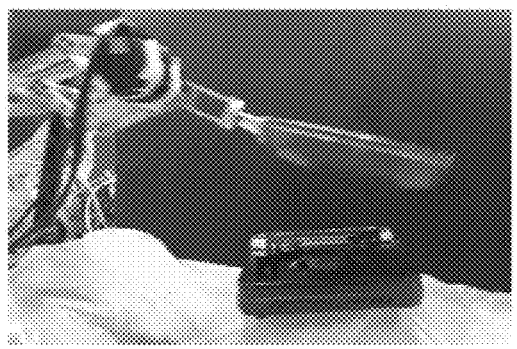
FIG. 5A to FIG. 5G show the photo pictures of stir-frying action by the mechanical arm of the present invention.
Figure 5B:
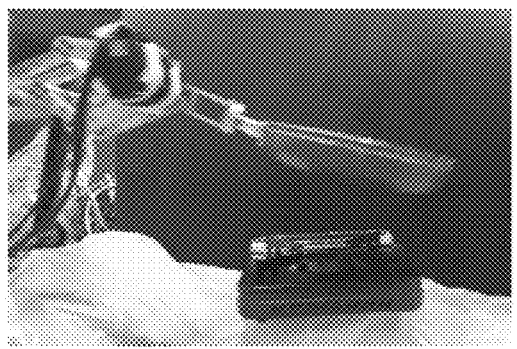
Figure 5C:
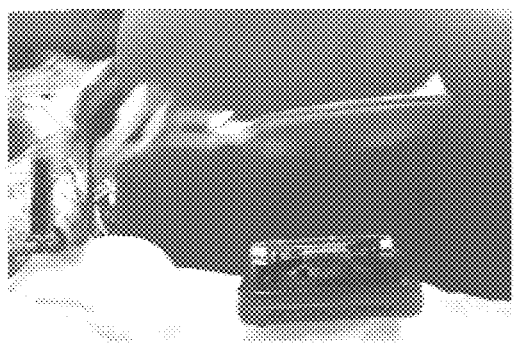
Figure 5D:
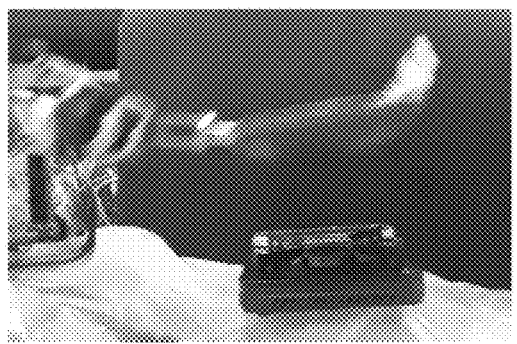
Figure 5E:
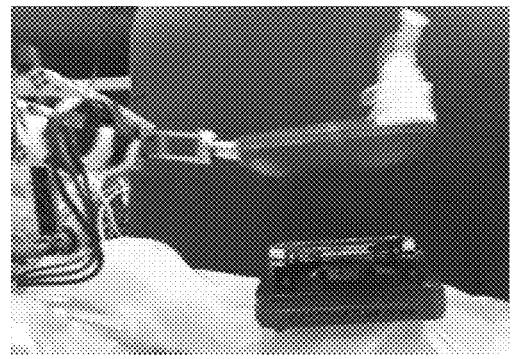
Figure 5F:
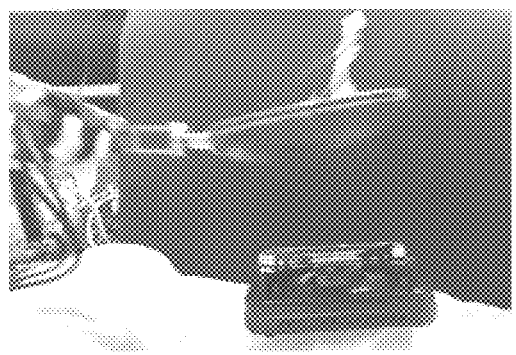
Figure 5G:
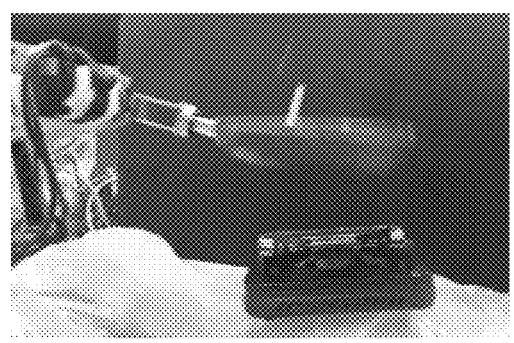

Please referring to FIG. 5A to FIG. 5, the parameter of the speed level adjusting module (411) is 95%, the parameter of the speed ratio of forwarding and returning strokes adjusting module (412) is 120%, the parameter of the rising time adjusting angle module (413) is 5 units and the frequency of stir-frying action is 4 times, the parameter of the motor joint angles adjusting module (414) is 100%, the parameter of the frying pan initial angle adjusting module (415) is from 0 degree to stir-fry the spaghetti (180g) under some oil and salt via parametric trajectory calculated by continuous photo pictures, which conforms to the chef's stir-frying action performance.

The present invention also provides an automatic production kitchen, which comprises: a mechanical arm as mentioned above, a pan, a heating device and an operation device.

The pan is installed in the second end of the third rocker link.

The heating device is used for detecting the temperature of the pan and for providing a heating temperature.

The material preparation device has a plurality of material preparation space for holding foods materials.

The operation device is used for controlling the material preparation device to open the corresponding material preparation space and is used for placing the food materials into the pan when receiving a stir-frying command, and is used for controlling the stir-frying action of the mechanical arm and the heating temperature provided by the heating device.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A mechanical arm for performing a stir-frying action in cooking, which comprises:
    a fixed base consisted by a first motor and a second motor, wherein a first length ($a_5$) is between the first motor and the second motor;
    a first rocker link having a second length ($a_1$), wherein a first end (A) of the first rocker link is connected with the first motor, and the first motor is used for driving the first rocker link to do a first angular movement ($\theta_{motor1}=\theta_{bac}+\theta_{cae}$);
    a first float link having a third length ($a_2$), wherein one end of the float link is cotter jointed with a second end of the first rocker link;
    a second float link having a fourth length ($L_{cm}$), wherein a first end (C) of the second float link is cotter jointed with a second end of the first float link, and the second end of the second float link has a third motor;
    a second rocker link having a fifth length, wherein a first end (E) of the second rocker link is connected with the second motor, and the second motor is used for driving the second rocker link to do a second angular movement ($\theta_{motor2}=\theta_{dem}+\theta_{mme}$), a second end (D) of the second connecting end is cotter jointed with a sixth length ($a_3$) between the cutting joint point and the first end of the second float link; and
    a third rocker link having a seventh length ($L_{mp}$), wherein a first end (M) of the third rocker link is connected with the third motor, and the third motor is used for driving the third rocker link to do a third angular movement.

2. The mechanical arm of claim 1, wherein the first angular movement ($\theta_{motor1}=\theta_{bac}+\theta_{cae}$) and the second angular movement ($\theta_{motor2}=\theta_{dem}+\theta_{mme}$) are selected form the equation group of the first length ($a_5$), the second length ($a1$), the third length ($a_2$), the fourth length ($L_{cm}$), the fifth length ($a_4$), and the sixth length ($a_3$).

3. The mechanical arm of claim 2, wherein the equation group comprises the following limitation equation:

$$\theta_{me} = \tan^{-1}\left(\frac{M_y - E_y}{M_x - E_x}\right)$$

$$\theta_{dem} = \cos^{-1}\left[\frac{(a_4^2 + L_{EM}^2 - (L_{CM} - a_3)^2)}{2a_4 L_{CM}}\right]$$

$$\theta_{motor2} = \theta_{me} + \theta_{dem}$$

$$D_x = E_x + a_1 \cos\theta_{motor2}$$

$$D_y = E_y + a_1 \sin\theta_{motor2}$$

$$\theta_{dm} = \tan^{-1}\left(\frac{M_y - D_y}{M_x - D_x}\right)$$

$$C_x = D_x + a_3 \cos\theta_{dm}$$

$$C_y = D_y + a_3 \sin\theta_{dm}$$

$$\theta_{cae} = \tan^{-1}\left(\frac{C_y - A_y}{C_x - A_x}\right)$$

$$\theta_{bac} = \cos^{-1}\left[\frac{(a_1^2 + L_{AC}^2 - a_2^2)}{2a_1 L_{CM}}\right]$$

$$\theta_{motor1} = \theta_{cae} + \theta_{bac}.$$

4. The mechanical arm of claim 1, wherein the range of the first angular movement is from 0 to 120 degree.

5. The mechanical arm of claim 1, wherein the range of the second angular movement is from 80 to 120 degree.

6. The mechanical arm of claim 1, wherein the range of the third angular movement is from 90 to 120 degree.

7. The mechanical arm of claim 1, which further comprises:
    a control device having:
    a speed level adjusting module for controlling the time duration of the first angular movement, the second angular movement and the third angular movement to complete a stir-frying action;
    a speed ratio of forwarding and returning strokes adjusting module for controlling the time duration of the first angular movement and the second angular movement to do a horizontal direction action of the third motor;
    a rising time adjusting angle module for controlling the time duration of the first angular movement and the second angular movement to do a vertical direction action of the third motor;
    a motor joint angles adjusting module for controlling the time duration of the third angular movement; and
    a frying pan initial angle adjusting module for controlling the initial angle of the third angular movement.

8. A automatic production kitchen, which comprises:
    a mechanical arm of claim 1;
    a pan installed in the second end of the third rocker link;
    a heating device for detecting the temperature of the pan and for providing a heating temperature;
    a material preparation device having a plurality of material preparation space for holding foods materials; and
    an operation device for controlling the material preparation device to open the corresponding material preparation space and for placing the food materials into the pan when receiving a stir-frying command, and for controlling the stir-frying action of the mechanical arm and the heating temperature provided by the heating device.

* * * * *